United States Patent [19]

Hansen et al.

[11] Patent Number: 4,769,870
[45] Date of Patent: Sep. 13, 1988

[54] METHOD AND A SYSTEM FOR PEELING CRUSTACEANS

[76] Inventors: Otto D. Hansen, Östre Skovvej 21, DK-8240 Risskov; Bent K. Nielsen, Falkevej 45, DK-9352 Dybvad, both of Denmark

[21] Appl. No.: 46,514

[22] Filed: May 6, 1987

[30] Foreign Application Priority Data

May 6, 1986 [DK] Denmark .............................. 2075/86

[51] Int. Cl.$^4$ ............................................. A22C 29/02
[52] U.S. Cl. .......................................... 17/48; 17/51; 17/73
[58] Field of Search .......................... 17/48, 53, 73, 74

[56] References Cited

U.S. PATENT DOCUMENTS 3,528,124  9/1970  Wenstrom et al. ................. 17/74 X
4,639,976  2/1987  Hansen et al. ....................... 17/73 X

*Primary Examiner*—Willie G. Abercrombie
*Attorney, Agent, or Firm*—Antonelli, Terry & Wands

[57] ABSTRACT

To effect shelling of crustaceans surface heated crustaceans are shot against a water covered deflector plate in a vacuum chamber, whereby a practically complete deshelling is obtainable without any recirculation. The crustaceans are shot against the deflector plate in very thin flows through periodically operating inlet valves, whereby each single crustaceans will hit the deflector plate and be effectively deshelled thereby, with the crustaceans being subjected to aqueous surroundings for only a very short time.

9 Claims, 1 Drawing Sheet

METHOD AND A SYSTEM FOR PEELING CRUSTACEANS

BACKGROUND OF THE INVENTION

The present invention relates to a system and method for peeling crustaceans.

In, for example, British Patent Specification No. 2,122,871, corresponding to U.S. Pat. No. 4,639,976, the crustaceans are initially subjected to a short duration heating treatment so that the shells and areas jsut inside the shells are heated to a temperature higher than a temperature of interior meat portions of the crustaceans, whereafter, the crustaceans are subject to a rapid pressure drop so that the body liquid just beneath the shell is caused to boil vividly without the liquid in the inside portions of the crustaceans being brought to a boil. By this boiling action in the outer region, a substantial loosening of the shells from the outer surfaces of the meat bodies occurs and immediately after, or in connection with the outer boiling of the crustaceans, the crustaceans are caused to be moved rapidly towards or against a liquid surface, which will show a braking action on the outer shell portions, while the inner meat portions will continue their movement by the associated motion inertia, whereby the shell portions, as loosened, by the boiling, will be widely stripped off the meat bodies.

By virtue of the above described approach the crustaceans may shelled without any traditional and partly destroying mechanical treatment, and it has been found that a complete deshelling is achievable by recirculation of the crustaceans, which have been only partly shelled by the first treatment, as still occurring rests of shells will then be loosened by a renewed local heating of the liquid immediately underneath the shell rests, without the remaining crustaceans being damaged by a renewed very brief surface boiling and a following rapid movement of the animal into a braking liquid surface. In this manner it is possible to remove, for example, an average of some 50% of the shells by a first operation, while in a following operation additionally some 30% of the shells may be removed, and then finally some 15-18% in a third operation, such that the final result after three operations or two recirculations will be a practically acceptable removal of about 98% of the shells from the animals, while during the repeated treatments only very little of the meat product will get lost. Thus, this process exhibits a very high efficiency as compared with conventional mechanical treating of the crustaceans.

The purpose of the present invention is to provide a system and method of the aforementioned type, by which the efficiency or economy may be further improved. It has been found, rather surprisingly, that at least for many types of crustaceans such as shrimp it is possible to achieve a practically acceptable deshelling in only a single operation, when the braking liquid is present on an inclined deflector plate, against which the crustaceans are shot, rather than down into a bath of the liquid. However, there should preferably be used two deflector plates, arranged one after the other, such that the crustaceans after having hit the first plate will continue against the second plate and from there be conveyed for delivery to suitable separation means for the meat and the shells, respectively.

It is important that practically all of the crustaceans should individually hit the deflector plate or plates and not hit the plate members in a thick flow, as in the latter case many crustaceans would just hit each other and thereby be braked too softly to condition an effective deshelling. With the above described method it is possible to operate with a considerable amount of crustaceans per "shot", e.g. 1 kg of shrimps, because the crustaceans, by the firing down into the liquid, will all be subjected to the braking action of the liquid, while in connection with the invention the crustaceans, as mentioned, should be supplied in a thin flow or only few at a time. However, it is still possible to work with a considerable capacity, partly because the crustaceans may be shot against the plate from several supply ports arranged near each other, and partly because the crustaceans may be shot off with short intervals between the single small doses, e.g. at a rate of one dosis per second.

The invention shows the additional advantageous effect that the deshelled crustaceans will only to a limited degree or during a short interval of time need to be present in water, it being well known that the taste qualities of the crustaceans are considerably reduced, the longer the crustaceans are held in water. With the proposed method it is necessary to shoot the crustaceans down into a water bath and thereafter to move them in water to a special separator, in which the entirely deshelled crustaceans are separated, in water, from the shells and from the only partly deshelled crustaceans, and the latter will moreover have to be recirculated at least once through the system, upon their being separated from the loose shells, e.g. by air separation. In connection with the present invention it is sufficient to make use of an air separation for separating the shells from the entirely deshelled crustaceans, i.e. the liquid separator will simply not be required, and it is sufficient to use only a small amount of flow of water for a rapid transfer of the mixture of shells and crustaceans from the vacuum chamber to the air separator or to a conveyor for bringing the product to the air separator, whereby the crustaceans should remain in water for some few seconds only.

Thus, with the method and the system according to the invention is achieved both a high capacity due to the lack of any need of recirculation of the products, a simple design of the apparatus, because the said liquid separator can be avoided, and an improved quality of the products, because they are exposed to water only to a very limited degree.

Further details and advantages of the invention, which is defined more precisely in the appended claims, will appear from the following description with reference to the drawing, in which:

DETAILED DESCRIPTION

Figure 1:
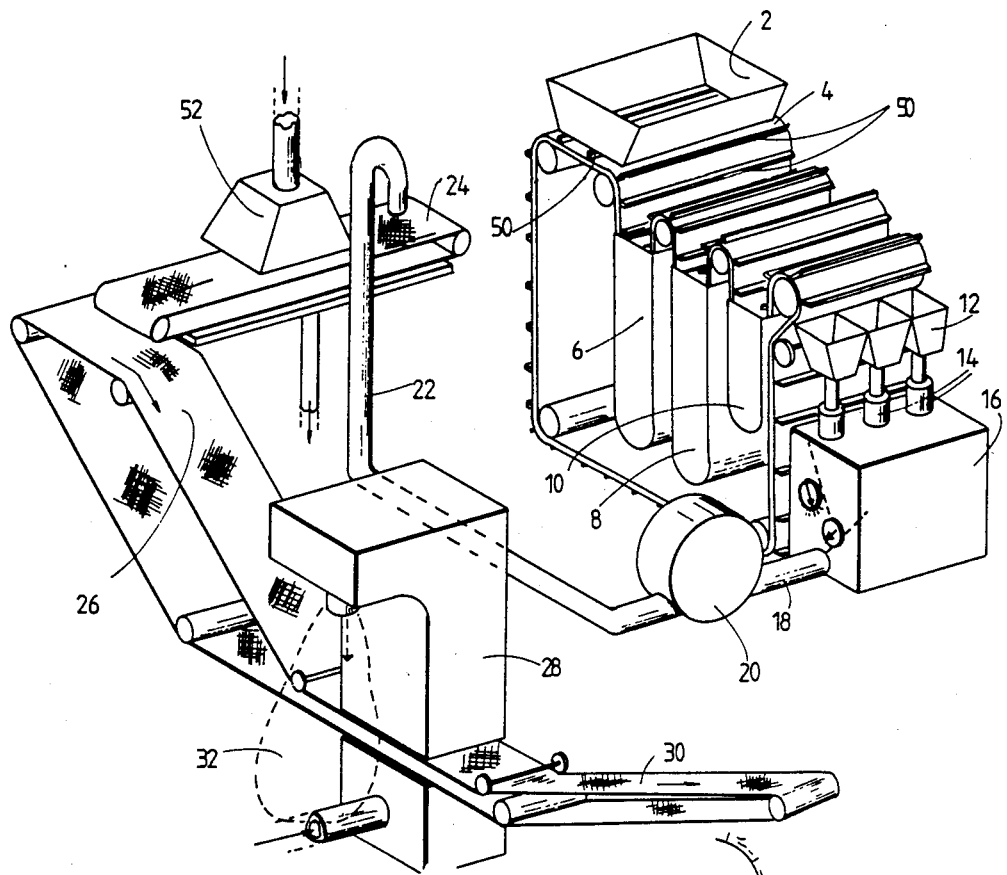
FIG. 1 is a schematic perspective view of a crustacean boiling and deshelling system according to the invention.

Referring now to the drawings wherein like reference numerals are used in both views to designate like parts and, more particularly, to FIG. 1, according to this Figure, a crustaceans boiling and deshelling system according to the present invention includes a receiver funnel 2 for fresh or thawed out crustaceans such as shrimps, an underlying conveyor belt 4, which takes the shrimps through a boiler 6, a cooler 8, and a heater 10, and therefrom to an input funnel 12 for the thus treated shrimps. The funnel 12 has three bottom outlets, which, through disphragm valves 14, are connected with a vacuum chamber 16, from the bottom of which an outlet pipe 18 leads to a pump 20, which delivers the sucked out product through a pipe 22 to a perforated conveyor belt 24. Via a further conveyor belt 26 the products are moved to an air separator 30, while the loose shells are delivered to a collector container 32.

Figure 2:
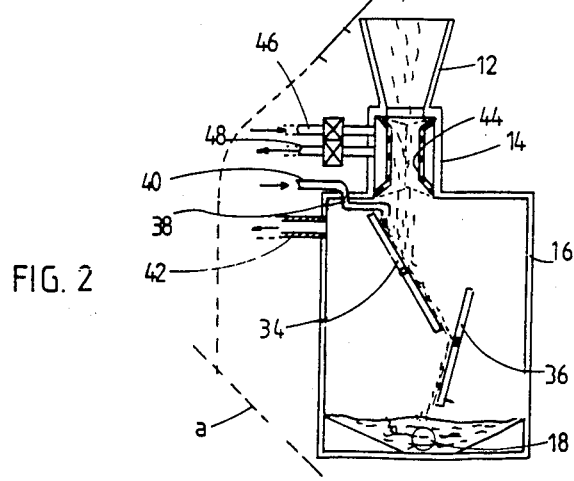
FIG. 2 is a schematic lateral sectional view of a deshelling station of the system.

As shown in FIG. 2 there is mounted inside the vacuum chamber 16, beneath the valves 14, an inclined plate member 34, which slopes downwardly towards an oppositely inclined plate member 36, and along the top edge of the upper inclined plate 34 is mounted a row of nozzles 38, which, from water pipes 40, conduct water down to the inclined plate to the effect that plate the inclined member 34 is held tolerably covered by water running downwardly over the plate member 34. The chamber 16 is connected with an exhaust pipe 42 leading to an exterior vacuum pump (not shown). The valves 14 have an interior diaphragm tube 44, and the space outside the diaphragm tube 44 is connected to respective sources of compressed air and vacuum, through respective pipes 46 and 48. The diaphragm tube 44 is a flat rubber tube, which in a free condition assumes a semiopen shape, while it is opened into a circular tubular shape when a vacuum is supplied through the valve 48 and is closed into a flat shape when compressed air is supplied through the valve 46.

The conveyor belt 4 is provided with protrusions 50, which from the bottom area of the funnel 2 will bring along a quite thin layer of shrimp, which are thereafter in a well known manner moved down into and up from the boiler 6, in which the shrimp are subjected to a conventional boiling treatment. Thereafter the boiled shrimp are cooled in a likewise known manner by being moved down into and up from the cooler 8, which is pervaded by cold water.

Prior to the deshelling operation, the conveyor belt 4 then conveys the shrimp through the heater 10, in which the shrimp, due to the associated short throughlet time, will only be heated at their outsides, to slightly underneath their surrounding shells, while the main portion of the meat core will not be heated noticeably. Immediately thereafter the thus preheated shrimp will be loaded into the funnel 12, in which they seek downwardly towards the respective bottom valve outlets 14 with an approximately even distribution therebetween.

The valves 14 or rather the diaphragm inserts 44 thereof are brought to open with short duration rather frequently, e.g. once per second, whereby the relatively few shrimp present in the funnel downlet just above the respective valve will be sucked down into the vacuum chamber 16. The associated opening period may be so short that the corresponding air intake into the vacuum chamber will not to any noticeable degree reduce the vacuum in the chamber, such that the vacuum therein may be maintained with the use of a vacuum pump of a moderate capacity.

Just as with the above described proposed method the system is so adapted that the preheated crustaceans, by their downlet into the vacuum chamber, are subjected to a pressure drop, whereby the body liquid of the animals just underneath the shell, is brought into an almost explosive boiling, such that the shells will be loosened hereby, and at the same time it is obtained that the animals are accelerated vividly down into the vacuum chamber.

Hereby the animals will hit the inclined plate member 34 in immediate continuation of the previous surface heating, and as mentioned, it has been found that it is hereby possible to achieve a practically total deshelling or a final loosening of the shell parts, though it has also been found necessary that the inclined plate is covered by a water film.

The crustaceans are to some degree braked by their hitting the plate member 34, but they will continue with a high velocity along the plate, and it has been found advantageous that they are hereby sent against the lower inclined plate 36, inasfar as a supplementary deshelling may take place when the animals hit this plate, without the crustaceans or the meat being damaged by this treatment. Thereafter the crustaceans have been braked such that normally a further deshelling effect will not be obtainable by making the animals hit a following, third plate member.

The now practically totally deshelled crustaceans will thus be conveyed to the bottom of the chamber 16 together with the water as supplied through the nozzles 38, and the bottom mixture of water, crustaceans and shell portions is pumped out by means of the pump 20, which is of a type capable of pumping out the product for delivery at atmospheric pressure without this pressure being able to convey itself back to the vacuum chamber.

The pumped out mixture is delivered to the conveyor belt 24 through the pipe 22. This belt is perforated, such that the water in the mixture will be drained off, and furthermore there is arranged overhead the belt 24 and air blower head 52, which will actively blow the adhering water down through the belt 24. It is important that the water is widely removed from the remaining mixture product, i.e. crustaceans meat and shells, prior to this mixture arriving at the air separator 28, as the desired separation in this unit may otherwise be made more difficult. For the same reason it is desirable that the product is moved through a path of considerable length between the blower head 52 and the air separator, unless there is arranged, along this path, special heating means for reducing the rest content of water in the product.

When the product of meat and entirely or almost loosened shell portions is reasonably dry by its arrival at the air separator 28 the loose and loosened shell portions may be separated out quite easily, these portions being blown upwardly by air blown through the perforated belt 26,30 from below, whereby the shell portions are collected in the container or sack 32, while the heavier meat pieces continue their movement outwardly along the delivery conveyor 30. The collector container or sack 32 is emptied or changed out as required, and the meat pieces delivered by the conveyor are collected and packed in any desired manner.

Suitably the inclined plate members 34 and 36 may be mounted such that their angular positions are adjustable for being optimized to the type of size of the treated crustaceans.

It will be understood that the inclination of the plates or surface members 34 and 36 should be considered in relation to the direction of introduction of the crustaceans through the valves 14,44, such that the animals will slide off without getting smashed directly against a stop surface. In absolute terms the plates will not have to be "inclined", viz. if the valves 14,44 define an inclined inlet flow of the animals, e.g. if the vacuum chamber is arranged on a floor represented by the dotted line as shown in FIG. 2.

The deflector plate members or surfaces 34, 36 function very well when they are fashioned of smooth steel, but they may consist of a less rigid material, e.g. semi-hard plastic or rubber. Good results have been obtained with a cross ribbed cover of a rubber plate of car tire quality, the ribs serving to increase the friction and braking of the animals along the surface. Also various hard and semihard woven sheet covers may be used, though only when pronounced wear resistant. The deflector surface should not necessarily be generally planar, as also a curved shape may be used.

The apparatus is primarily adapted for treating small size crustaceans from krill up to half-large shrimps. It has been found that for soft shelled spring shrimps the angle between the inlet flow and the deflector surface may advantageously be some 10°-15° only, while later in the year, when the shells are harder, the angle should be adjusted to some 15°-30°, preferably about 20°. In the first case the second deflector plate 36 may be parallel with the inlet flow, so as to be hit by the animal flow at an angle of 10°-15°, while in the latter case this plate should be adjusted to receive the flow from the first plate at angle steeper than said 15°-30°, e.g. 40°-60°.

In practice a highly satisfactory result has been obtained by adjusting the valves to fire twice a second with an opening time of 0.15 sec, whereby some 12-18 shrimps are fired by each operation. The opening time should not be much smaller, because the air flow may then be insufficient to accelerate the shrimps to the required high velocity. The opening time should not either be much longer, because that would imply an unnecessary air intake and thus required the capacity of the vacuum pump to be unnecessarily high. Thus, the opening time should preferably be somewhere between 0.1 and 0.5 sec., when the valve is a fast reacting valve having in open condition a flow-through area of some 3-10 $cm^2$, preferably about 5 $cm^2$. The vacuum should preferably be adjusted to 70-85%, a preferred magnitude being 75-80%. The flow distance from the valve to the first deflector plate may be some 20 cm, preferably not less than 10 cm; the distance may be still larger, but without any particular advantage.

As far as the required brief heating of the crustaceans is concerned reference is made to the examples stated in the aforementioned British Patent Specification No. 2,122,871 and corresponding number U.S. Pat. No. 4,639,976.

What is claimed is:

1. A method of deshelling crustaceans, the method comprising the steps of: subjecting the crustaceans to a brief surface heating and thereafter to a pressure drop for effecting a vivid boiling up of the body liquid just beneath shells of the crustaceans for loosening the shells, providing a braking means formed of a rigid or semirigid material surface in a vacuum chamber for removal of the shells, rapidly moving the crustaceans towards or against the braking means for removal of the shell, causing the crustaceans to be shot against the surface of the braking means at an oblique angle therewith in a thin flow so that practically all of the crustaceans hit said surface of the braking means directly, providing a flow of water over the surface of the braking means so as to convey the treated crustaceans and the loosened shell portions to a collector area in the vacuum chamber, pumping out the treated crustaceans and then subjecting the deshelled crustaceans to a separation by draining off the water from the treated crustaceans and then air separating the shells from the deshelled crustaceans.

2. A method according to claim 1, further comprising the steps of providing at least one operating valve for releasing the preheated crustaceans into the vacuum chamber, and periodically operating the at least one operating valve directly from ambient pressure surroundings.

3. A system for deshelling crustaceans, the system comprising a vacuum chamber having an inlet for preheated crustaceans, housing means for housing a braking means for decelerating of the crustaceans as introduced with a high velocity, means for releasing the treated crustaceans from the vacuum chamber to a separation means for separation of the treated crustaceans into deshelled crustaceans and loose shells, respectively, said braking means includes a rigid or semirigid surface on at least a first deflector body, said surface on the deflector body being arranged obliquely relative to an inlet path of the crustaceans and being associated with water supply means for supplying water onto the surface of the deflector body, said inlet for the preheated crustaceans comprising at least one inlet valve means for enabling an introduction of the crustaceans in a thin flow towards the surface of the deflector body, and wherein pump means are connected to the vacuum chamber for pumping out a mixture of water, shells and crustacean meat from the vacuum chamber for delivery of the mixture to said separation means for sorting out the deshelled crustaceans.

4. A system according to claim 3, wherein a plurality of inlet valve means are provided and disposed in a parallel relationship.

5. A system according to claim 4, wherein the inlet valve means include diaphragm valves controlled to periodically open and close a connection directly between the vacuum chamber and an open supply container.

6. A system according to claim 4, wherein a water draining conveyor moves the drained product direct to an air separator, in which the shells are separated from the deshelled animals, conveyor means being provided for bringing the latter direct to a delivery position without the crustaceans being subjected to recirculation or further separation treatment.

7. A system according to claim 4, wherein a further braking means is mounted so as to receive the crustaceans released from the first deflector body.

8. A system according to claim 4, wherein an angular position of the surface of the deflector body is adjustable.

9. A system according to claim 4, wherein the surface of the deflector body is formed of a rubber-like material and is one of granulated or knurled.

* * * * *